US006972400B2

(12) United States Patent
Halmos

(10) Patent No.: US 6,972,400 B2
(45) Date of Patent: Dec. 6, 2005

(54) MULTI-MODE VIBRATION SENSOR LASER

(75) Inventor: Maurice J. Halmos, Encino, CA (US)

(73) Assignee: Raytheon Company, Waltham, MA (US)

( * ) Notice: Subject to any disclaimer, the term of this patent is extended or adjusted under 35 U.S.C. 154(b) by 92 days.

(21) Appl. No.: 09/797,220

(22) Filed: Jun. 11, 2001

(65) Prior Publication Data
US 2003/0075677 A1 Apr. 24, 2003

Related U.S. Application Data

(60) Provisional application No. 60/245,130, filed on Nov. 2, 2000.

(51) Int. Cl.[7] ............................................. H01J 40/14
(52) U.S. Cl. ........................ 250/214 R; 250/227.11; 73/1.82
(58) Field of Search .................... 250/552, 559.29, 250/559.32, 216, 234, 306–311, 182, 225, 250/227.11; 381/172; 372/18, 20; 359/340, 359/346; 73/182, 105; 356/493

(56) References Cited

U.S. PATENT DOCUMENTS

| 4,267,732 | A | * | 5/1981 | Quate ........................... 73/606 |
| 4,339,821 | A | * | 7/1982 | Coppock et al. ............. 359/311 |
| 5,088,808 | A | * | 2/1992 | O'Meara ...................... 359/276 |
| 5,278,855 | A | | 1/1994 | Jacobovitz-Veselka et al. |
| 5,646,396 | A | * | 7/1997 | Richard ........................ 250/216 |
| 5,657,405 | A | * | 8/1997 | Fujiwara ....................... 385/12 |
| 5,912,915 | A | * | 6/1999 | Reed et al. .................... 372/93 |
| 5,919,140 | A | * | 7/1999 | Perelman et al. ............ 600/476 |
| 6,097,741 | A | * | 8/2000 | Lin et al. ........................ 372/6 |
| 6,154,551 | A | * | 11/2000 | Frenkel ........................ 359/150 |
| 6,178,813 | B1 | * | 1/2001 | Bruno et al. ................... 73/105 |
| 6,304,362 | B1 | * | 10/2001 | Zheludev et al. ............ 359/241 |
| 6,404,797 | B1 | * | 6/2002 | Mooradian ................ 372/38.05 |
| 6,421,573 | B1 | * | 7/2002 | Kafka et al. ................. 700/121 |

FOREIGN PATENT DOCUMENTS

GB 2 334 171 A 1/1999
WO WO 00 59081 10/2000

OTHER PUBLICATIONS

Holm, A. et al.: "Nondestructive Evaluation of Saw Devices Using A High-Resolution Optical Detection Technique": vol. 51, No. 2, Mar. 1, 1997, pps. 91-96, XP000731195, Issn: 0001-1096, pp. 91, r-h col., last para.—pp. 92, I-h co., para. 1; fig. 2.

Ning Y. N. et al.: A Novel Optical Heterodyne Vibration Sensor Scheme, Preserving Directional Information and Using A Short Coherence Length Source: Optics Communication, North-Holland Publishing Co., Amsterdam, NL, vol. 85, No. 1, Aug. 15, 1991, pps. 10-16, XP000218343, p. 14, r-h col.; figures 2, 3.

* cited by examiner

Primary Examiner—David Porta
Assistant Examiner—Stephen Yam
(74) Attorney, Agent, or Firm—John E. Gunther; Leonard A. Alkov; Karl A. Vick

(57) ABSTRACT

A multimode remote vibration sensor. The inventive sensor (8) includes a mode locked laser transmitter (10); a receiver (30) adapted to detect signals transmitted by the laser (10) and reflected by an object (22) and a signal processor (40) for analyzing the signals and providing an indication with respect to a vibration of the object (22). The laser is particularly novel as a vibration sensor transmitter inasmuch as it includes a mode locking mechanism. The mode locking mechanism causes the laser to output energy at all modes within the gain profile in phase with one another. The result is a series of tight clean pulses which may be used for range resolved vibration and one-dimensional (high resolution ranging) applications.

13 Claims, 7 Drawing Sheets

FABRY-PEROT LASER MODES

PULSE SPACING IS,
T= 2ℓ/C

FIG. 2g *PRIOR ART*
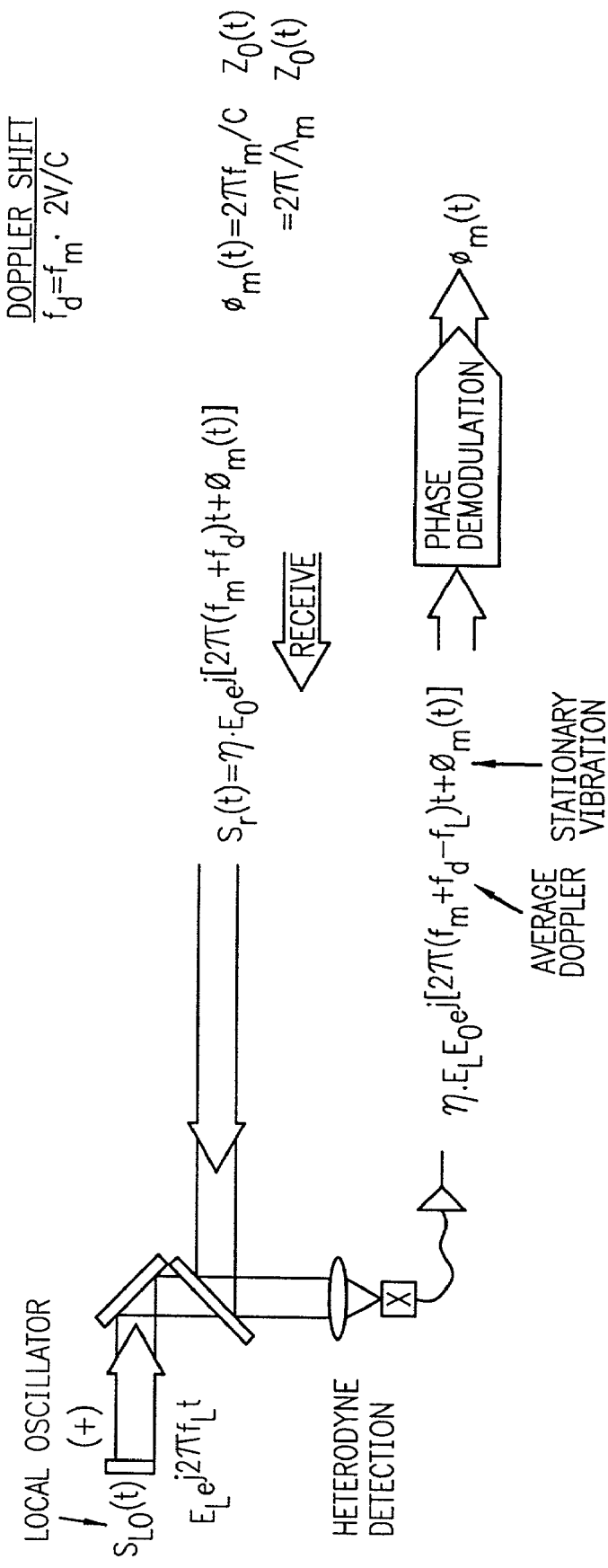

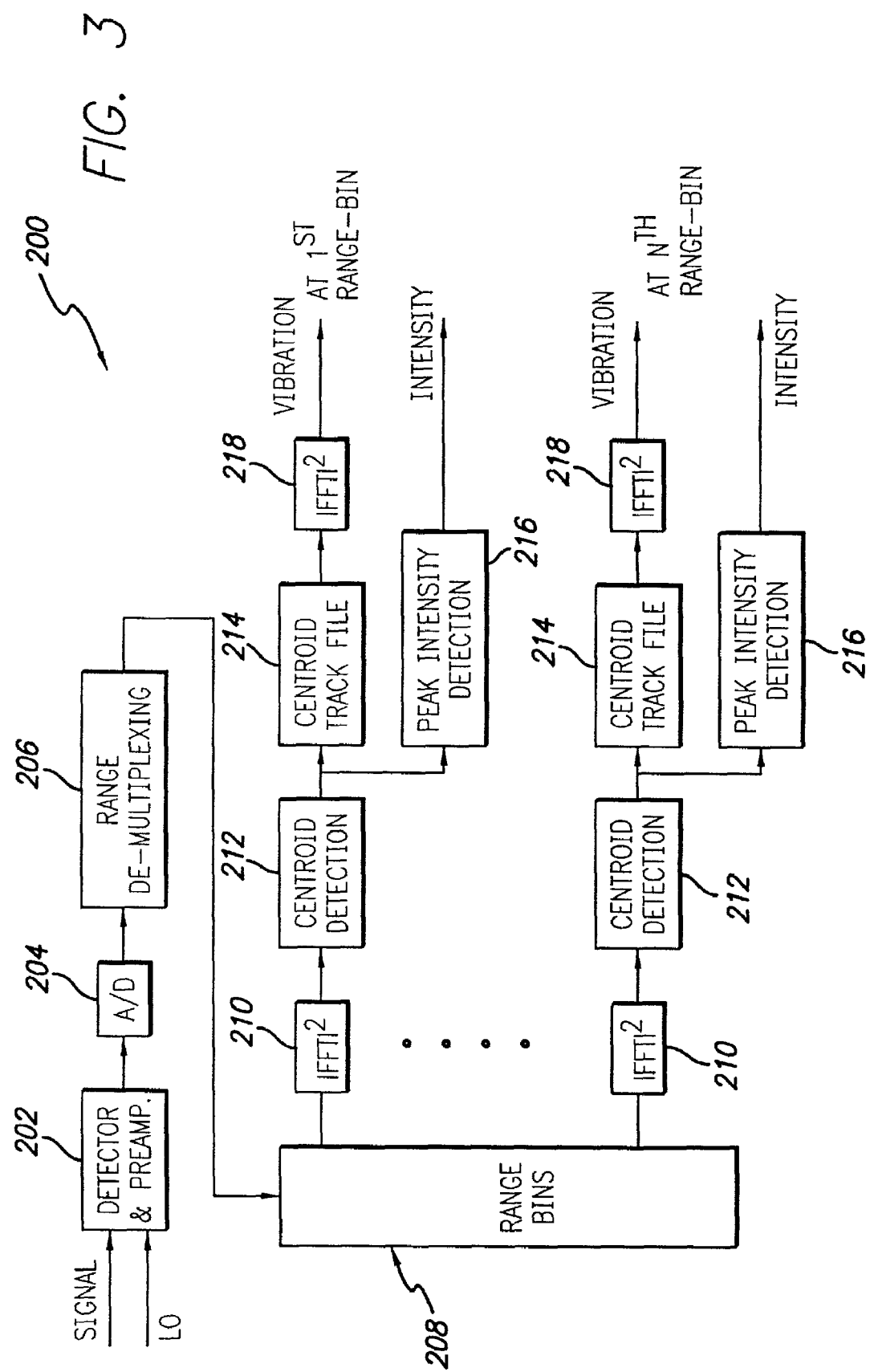

MULTI-MODE VIBRATION SENSOR LASER

This application claims benefit of provisional No. 60/245,130 filed Nov. 2, 2000.

BACKGROUND OF THE INVENTION

1. Field of Invention

The present invention relates to laser based systems and methods. More specifically, the present invention relates laser based remote vibration sensors and methods.

2. Description of the Related Art

Remote vibration sensors have been used to identify friendly or hostile vehicles, detect mines, examine hidden structures and a variety of other military, commercial and industrial functions. Conventional remote vibration sensors transmitted an electro-optic (laser) beam or an acoustic tone and analyzed the return signal looking for any change in the Doppler shift thereof. The limited range of the acoustic approaches have caused system designers to favor laser based systems for military and other applications for which long range operation is of paramount importance. Conventional laser based vibration sensors required lengthy, uniform, noise-free output waveforms. Unfortunately, lasers generally output energy with multiple modes and arbitrary phases. Efforts to limit the lasers to a single mode have tended to increase the cost and complexity of the system while severely limiting the efficiency thereof This was due to the requirement to seed the transmitter to produce a single frequency output at higher powers and an associated need for a local oscillator which had to be frequency locked to the transmitter.

Hence, there is an ongoing need in the art for a simple, accurate, low cost, efficient laser transmitter suitable for use in remote, long range, vibration sensing applications.

Further, current more demanding applications require highly accurate laser transmitters for high resolution ranging (one-dimensional profiling) and/or laser illumination for two-dimensional and three-dimensional sensing applications. For example, one dimensional profiling allows for the target returns to be matched against a database to identify the target type. For two and three dimensional sensing applications, a tight, highly accurate sensing pulse is transmitted and used to illuminate features of a target. The tight pulses reflect off of various surfaces of the target differently and reflect return pulses which are processed with sophisticated signal processing algorithms to yield more complete images of the target. Two-dimensional and three-dimensional imaging allows for a display of the target return data or an image of the target based on data from a stored database.

In any case, conventionally, for these more sophisticated vibration sensing applications and other applications, separate laser transmitters have been required. Unfortunately, the use of multiple transmitters adds significantly to the cost and weight of deployment and would be impractical for many significant applications.

Hence, there is a further need in the art for a simple, accurate, low cost, efficient laser transmitter suitable for use in remote, long range, vibration sensing applications which may be implemented in a single laser transmitter capable of performing single point ranging, one-dimensional profiling and/or laser illumination for two-dimensional and three-dimensional sensing applications.

SUMMARY OF THE INVENTION

The need in the art is addressed by the multimode remote vibration sensor of the present invention. The inventive sensor includes a mode locked laser transmitter; a receiver adapted to detect signals transmitted by the laser and reflected by an object and a signal processor for analyzing the signals and providing an indication with respect to a vibration of the object.

The laser is particularly novel as a vibration sensor transmitter inasmuch as it includes a mode locking mechanism. Unlike the single mode laser transmitters that typify the prior art, the mode locking mechanism of the present invention causes the laser to output energy at all modes within the gain profile in phase with one another. The result is a series of tight clean pulses which may be used for range resolved vibration and one-dimensional (high resolution ranging) applications.

In a particular embodiment, the laser is an erbium or erbium, ytterbium-doped, fiber pumped laser and the mode locking mechanism is a passive quantum well absorber crystal or an active acoustic crystal mounted in the laser cavity. In any event, the return signals are received and processed to extract vibration, range-resolved vibration, one-dimensional profiling or three-dimensional imaging information. To this end, the signal processor includes a range de-multiplexer for organizing the return signals into range bins. For each range bin, the signal processor further includes means for extracting a signal representing vibration for each range bin and a signal representing intensity for each range bin.

BRIEF DESCRIPTION OF THE DRAWING

FIG. 2g is a diagram of the modes in a laser cavity having a mode selection element therein.

FIG. 3 is a diagram of the multifunction sensor receiving and processing method of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
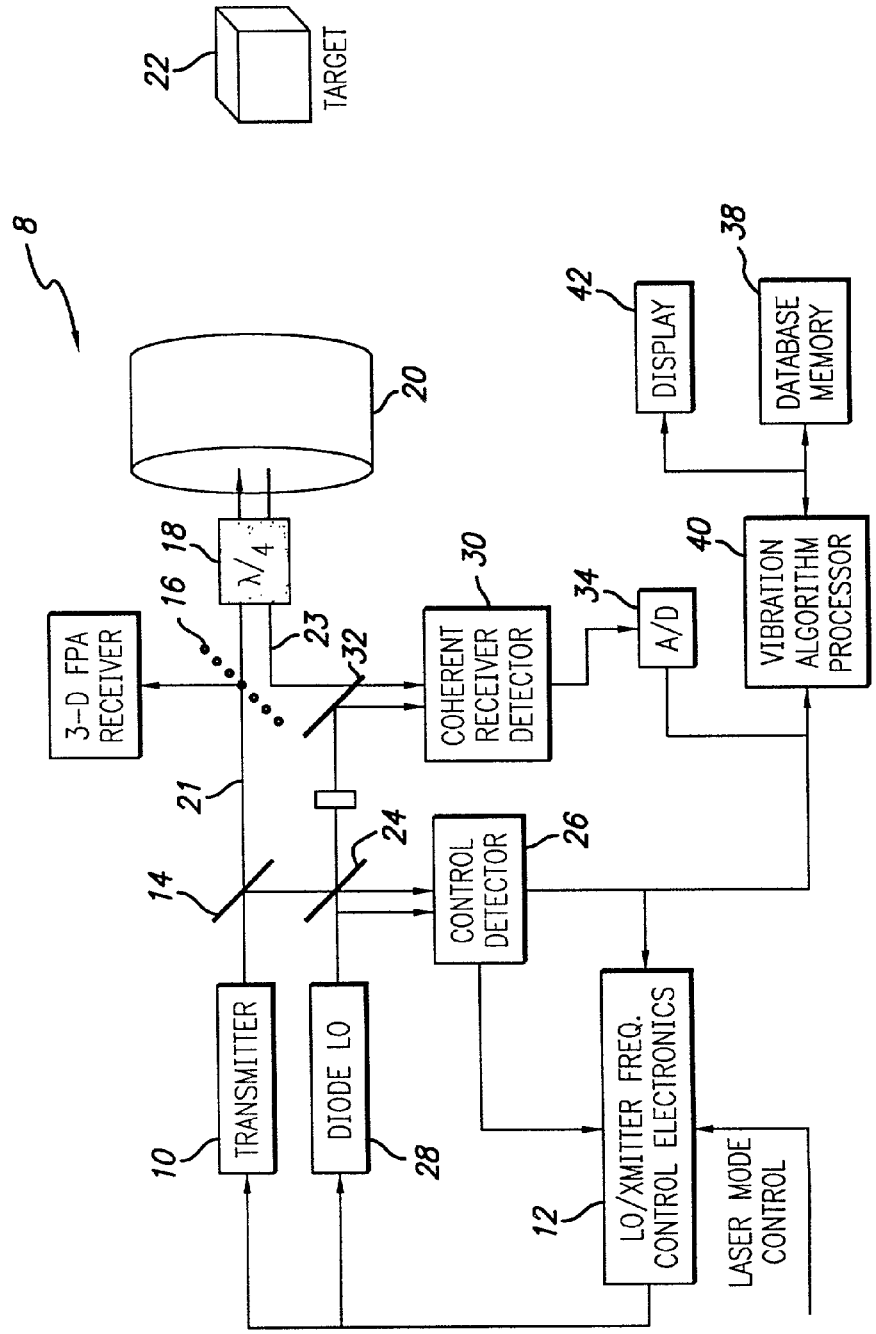
FIG. 1 is a block diagram of an illustrative implementation of a multifunctional sensor implemented in accordance with the present teachings.

FIG. 1 is a block diagram of an illustrative implementation of a multifunctional sensor implemented in accordance with the present teachings. The sensor 8 includes a multifunctional transmitter 10 implemented in accordance with the present teachings. As discussed more fully below, the transmitter 10 outputs a unique mode locked output signal particularly well-suited for vibration sensing. The transmitter is shown in detail in FIG. 2a.

Figure 2A:
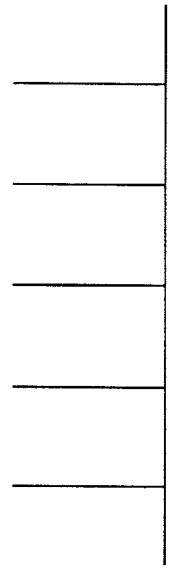
FIG. 2a is a diagram of the optical configuration of the transmitter of the illustrative embodiment configured to provide a mode locked output.

FIG. 2a is a diagram of the optical configuration of the transmitter of the illustrative embodiment configured to provide a mode locked output.

Figure 2B:
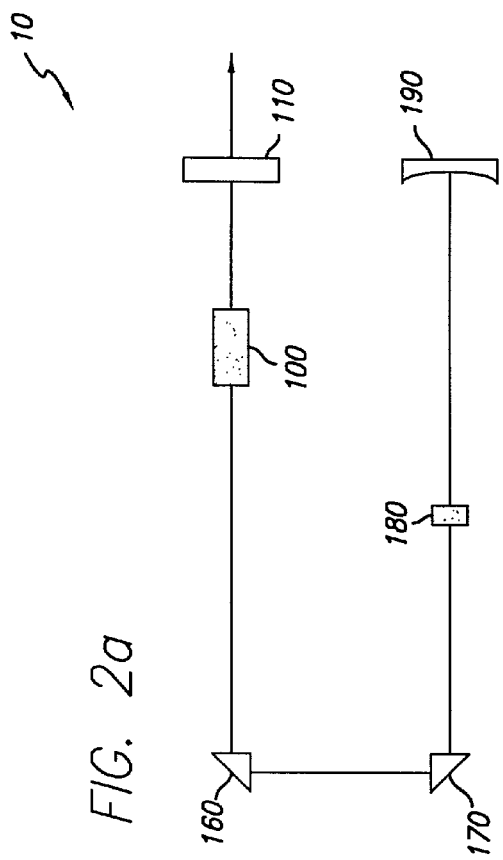
FIG. 2b depicts a mode locked pulse train.

FIG. 2b depicts a mode locked pulse train. Returning to FIG. 2a, the multifunctional transmitter 10 includes a gain medium 100 disposed in an optical cavity provided by a partially reflective output coupler 110 and a high reflectivity mirror 190. In the illustrative embodiment, the gain medium 100 is an erbium or erbium, ytterbium-doped, crystal pumped via optical fibers (not shown).

In the mode locked configuration, as is well known in the art, the outcoupler 110 and the high-reflector 190 provide a resonant cavity in which there are multiple resonant modes or frequencies. The frequencies are uniformly spaced at c/2l, where 'c' is the speed of light and 'l' is the length of the cavity. These modes are called Fabry-Perot laser modes and are depicted in FIG. 2c.

Figure 2M:
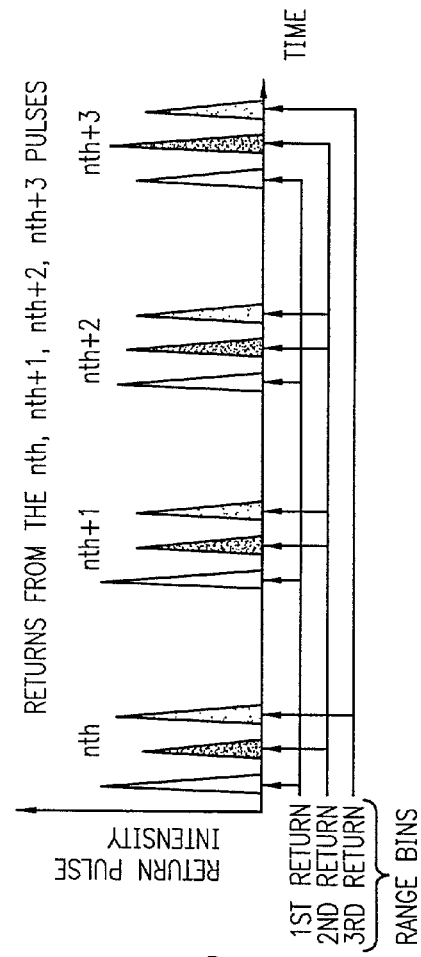
FIG. 2m is a diagram illustrating the returns from the pulses generated by the transmitter of the present invention.
Figure 2C:
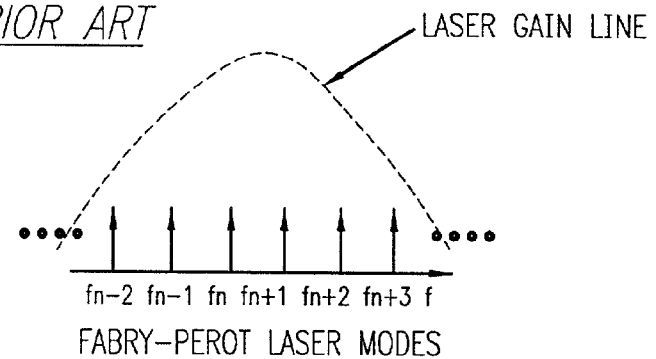
FIG. 2c is a diagram that illustrates the modes that exist within a laser cavity.

FIG. 2c is a diagram that illustrates the modes that exist within a laser cavity. When a gain medium is added to the cavity, a gain profile is provided as depicted in FIG. 2c. With a gain medium inside the cavity, there will be a region in which there is optimal gain, each resonant mode under the gain line can lase. Energy at the laser modes within the gain profile lases and will be output by the outcoupler in random phases as depicted in FIG. 2d.

Figure 2E:
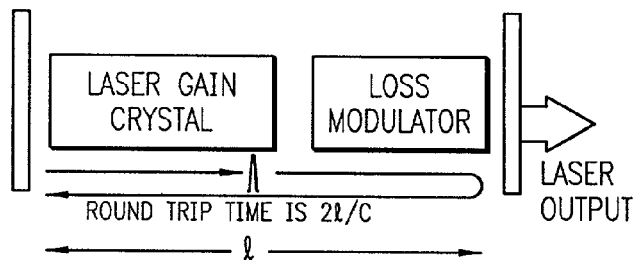
FIG. 2e is a simplified diagram of a typical laser cavity with a gain medium and a loss modulator disposed therein.
Figure 2D:
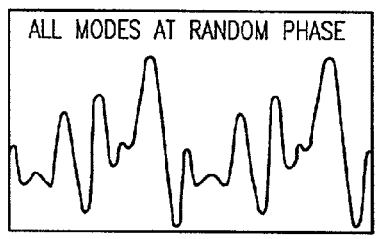
FIG. 2d is a diagram that illustrates the output of a typical laser with modes at random phase.

FIG. 2d is a diagram that illustrates the output of a typical laser with modes at random phase.

FIG. 2e is a simplified diagram of a typical laser cavity with a gain medium and a loss modulator disposed therein.

Figure 2F:
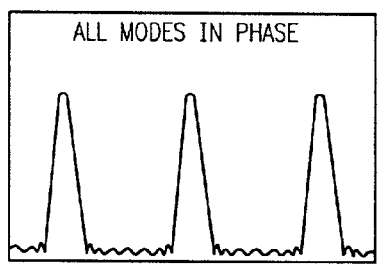
FIG. 2f is a diagram that illustrates the output of a typical laser with modes in phase.

FIG. 2f is a diagram which illustrates the output of a typical laser with modes in phase. Note that in FIG. 2d, with the phases of the modes being random, the sine peaks do not line up for narrow pulses. However, the addition of a loss modulator to the cavity as depicted in FIG. 2e has the effect of lining up the modes such that the modes are in phase as depicted in FIG. 2f. That is, the loss modulator excites all the modes under the gain line of the laser and keeps them in phase. The laser is said to be 'mode-locked' in that the modes under the gain line exist and are lined up in phase. This contrasts with the typical conventional single mode laser transmitter used for vibration sensing. Single mode laser transmitters generally employ a mode selection element, Etalon or seeded mode, to isolate a single mode and suppress the other modes under the gain line. This is depicted in FIG. 2g.

FIG. 2g is a diagram of the modes in a laser cavity having a mode selection element therein. Unfortunately, as mentioned above, the isolation of a single mode and the suppression of the other modes in a cavity is difficult and adds significantly to the cost and complexity of the system.

However, as illustrated in FIG. 2a, in accordance with the present teachings, instead of isolating a single mode and suppressing the other modes in the cavity, the mode locking element 180 is added to excite the modes so that the modes line up in phase. The mode locking element or loss modulator 180 can be: 1) a passive mode locker, i.e., a crystal that is normally opaque to light (does not let the light through) until it reaches a certain intensity threshold (e.g., a passive multiple quantum well absorber crystal such as gallium arsenide) or 2) an active mode-locker with an acoustic crystal which may be purchased from IntraAction Corp in Bellwood, Ill., or Brimrose Corp in Baltimore Md.

Figure 2H:
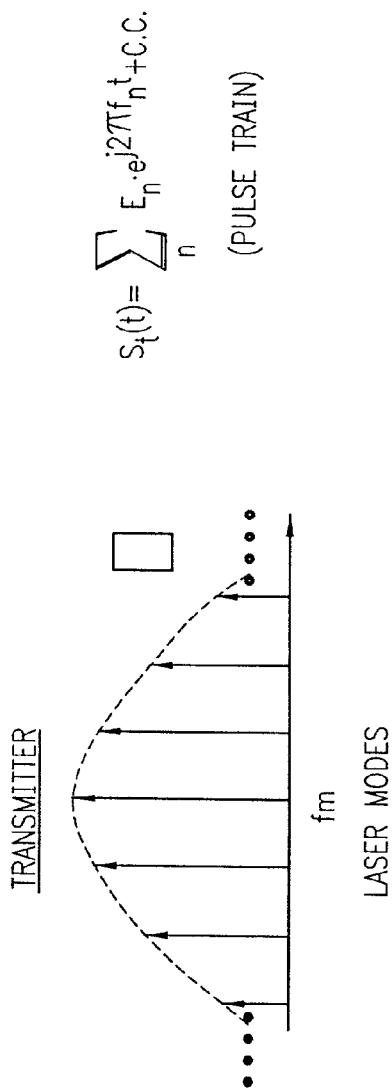
FIG. 2h is a diagram illustrative of the output of the transmitter of the illustrative embodiment in the mode locked configuration.
Figure 2H:
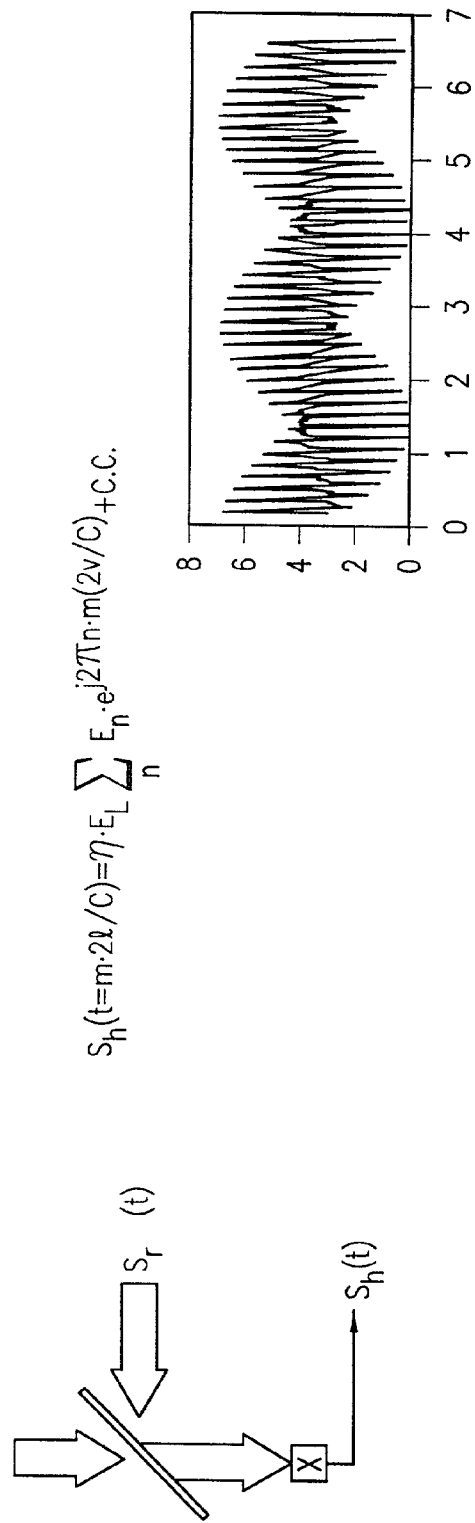

FIG. 2h is a diagram illustrative of the output of the transmitter 10 of the illustrative embodiment in the mode locked configuration.

As shown in FIG. 1, the output of the transmitter 10 passes through a first polarizer 14, a polarizing beamsplitter 16, a one-quarter wave plate 18 and a telescope 20 to a target 22. Pulses of energy reflected off the target 22 are collected by the telescope 20 and focused on the quarter-wave plate 18. The result of two passes through the quarter-wave plate is to induce a 90° rotation in the horizontal polarization of the output beam 21 with respect to the return signal 23. The vertically polarized component of the output beam 21 is directed to a control detector 26 via the first polarizer 14 and a second polarizer 24. The second polarizer 24 also serves to direct the vertically polarized output of a local oscillator diode laser 28 to the control detector 26. In accordance with the present teachings, the local oscillator 28 may be set to any mode within the gain line of the transmitter 10. The horizontally polarized output of the local oscillator 28 is rotated by a 90° rotator 43 and then is reflected by a third polarizer 32 to a receiver detector 30. The receiver detector 30 also receives the return beam 23 via the third polarizer 32.

The control detector 26 and the receiver detector 30 may be implemented with diode detectors. The control detector 26 and receiver detector 30 allows for a differential detection of the received signal relative to the transmitted signal 21. The output of the receiver detector 30 is digitized by an analog-to-digital converter 34 and input to a signal processor 40 along with the output of the control detector 26. The speed of the analog to digital converter is selected to match the pulse width of the return pulse. The signal processor may be a microprocessor which implements a vibration detection algorithm in software appropriate for the output mode of the laser as discussed more fully below. The processor draws from a database stored in a memory 38 and outputs to a display 42.

The vibration detection method of the present is best illustrated with reference to FIGS. 2h–m.

Figure 2I:
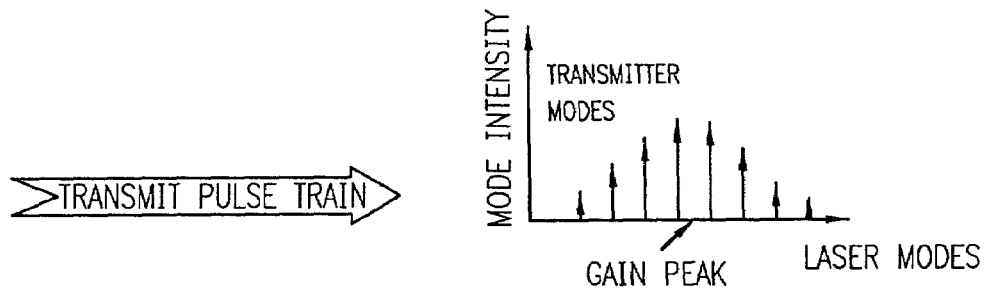
FIG. 2i shows the transmit pulse train.
Figure 2J:
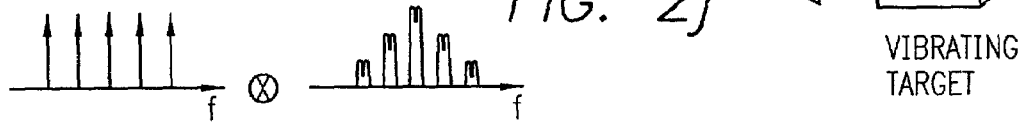
FIG. 2j depicts local oscillator sampling of the heterodyne return pulse train with a microDoppler at a rate of c/2l.
Figure 2K:
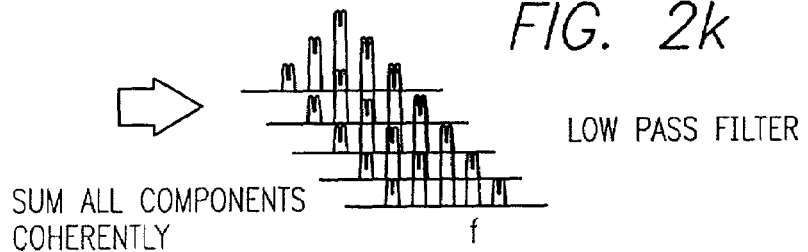
FIG. 2k shows the result of the sampling operation.

FIG. 2i shows the transmit pulse train. FIG. 2j depicts local oscillator sampling of the heterodyne return pulse train with a microDoppler at a rate of c/2l. FIG. 2k shows the result of the sampling operation. The result of sampling (convolution in the frequency domain) is the sum of multiple versions of the return, shifted by c/2l. The components add up coherently because the waveform is coherent.

Figure 2L:
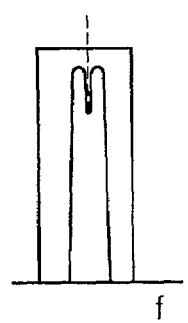
FIG. 2l depicts the result of low pass filtering of the sampled signal.

FIG. 2l depicts the result of low pass filtering of the sampled signal. In accordance with the present teachings, a sampled waveform is generated for each range bin as depicted in FIG. 2m.

FIG. 2m is a diagram illustrating the returns from the pulses generated by the transmitter of the present invention. For each sampled waveform, the system 8 performs a Fourier transform for each range bin and sums the signal strength for each range bin for 1D profiling. This is depicted in FIG. 3.

FIG. 3 is a diagram of the multifunction sensor receiving and processing method of the present invention. As shown in FIG. 3, the method 200 begins with the detection and pre-amplification of the received signal in hardware at step 202. At step 204, the detected and amplified signal is digitized. At steps 206 and 208, the digitized return signals are separated into range bins. For each range bin, of which N are shown, at step 210, a Fast Fourier transform is performed on the digitized signal. Next, at step 212, the centroids of the transformed signal that are above a predetermined detection threshold are detected. At step 214, the centroid for each pulse for each range bin is recorded in a track file and at step 216, the peak intensity is detected and output. The centroid track file keeps a record of the instantaneous velocity recorded at each time interval. At step 218, a Fast Fourier Transform is performed on the track file and outputs a signal representative of the vibration of the target 22. Methods and algorithms for performing Fast Fourier Transforms, centroid detection and peak detection are well known to those of ordinary skill in the art. The vibration information may be processed to extract vibration, range-resolved vibration, one-dimensional profiling or three-dimensional imaging information.

Returning to FIG. 1, a detected vibration signature may be used as a reference for a lookup table in the database memory 38 to extract information and identification data with respect to the target and an image therefor. The image may then be sent to the display 42.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A remote vibration sensor comprising:
   a mode locked laser transmitter;
   a receiver adapted to detect signals, transmitted by the laser transmitter and reflected by an object and
   a signal processor for analyzing the signals and providing an indication with respect to a vibration of the object, said signal processor including a range de-multiplexer for organizing the signals into range bins and means for extracting a signal representing vibration detected for each range bin.

2. The invention of claim 1 wherein the laser transmitter includes a laser and means for mode locking the output thereof.

3. The invention of claim 2 wherein the laser is an erbium-doped crystal laser.

4. The invention of claim 3 wherein the laser is an erbium, ytterbium-doped laser.

5. The invention of claim 3 further including means for pumping the laser via an optical fiber.

6. The invention of claim 2 wherein the means for mode locking includes a quantum well absorber.

7. The invention of claim 2 wherein the means for mode locking includes an acoustic crystal.

8. The invention of claim 1 wherein the signal processor further includes means for extracting a signal representing intensity of the signal detector for each range bin.

9. The invention of claim 1 includes the means for performing a Fast Fourier Transform on said signals in said range bins to provide transformed signals.

10. The invention of claim 9 includes the means for detecting centroids of said transformed signals.

11. The invention of claim 10 includes the means for recording said centroids in a track file.

12. The invention of claim 10 wherein said track files includes a record of an instantaneous velocity recorded in each time interval.

13. The invention of claim 10 includes the means for performing a Fast Fourier Transform on each track file to output said signal representative of said vibration.

* * * * *